Feb. 15, 1927.

M. C. OVERMAN

CUSHION TIRE

Filed Sept. 13, 1921

1,618,128

INVENTOR
Max Cyrus Overman
BY
E. W. Scherr Jr. ATTORNEY

Patented Feb. 15, 1927.

1,618,128

UNITED STATES PATENT OFFICE.

MAX CYRUS OVERMAN, OF NEW YORK, N. Y., ASSIGNOR TO O. & W. COMPANY, A CORPORATION OF NEW YORK.

CUSHION TIRE.

Application filed September 13, 1921. Serial No. 500,367.

My present invention relates to a cushion-tire constructed on a novel application of principles enabling me to provide a tire having a relatively wide tread-portion for resisting penetration into the roadway with a relatively narrow base portion adapted to be mounted on a standard pneumatic tire rim, with properly positioned and spaced quick acting, shock-absorbing and load-carrying upright members and lateral bracing members uniting said tread and base portions into a particularly effective cushion tire interchangeable on standard rims with a pneumatic tire and adapted to high speed vehicles.

These and other features and advantages are provided in the preferred form of my present tire as will appear from an understanding of the following description in connection with the drawings.

Figure 1:
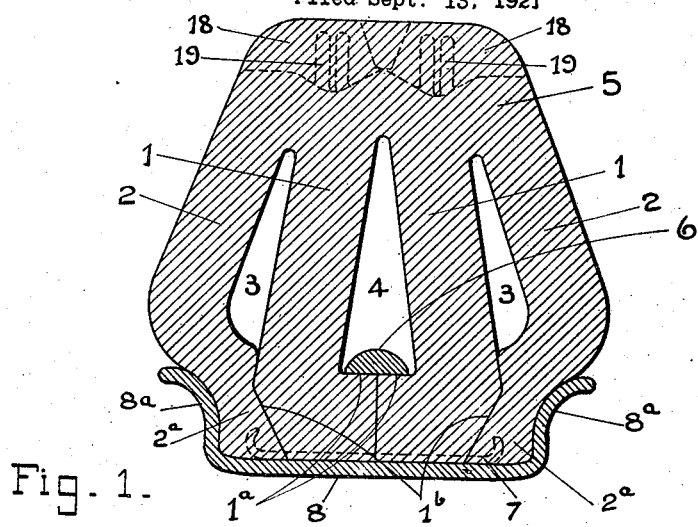
Figure 2:
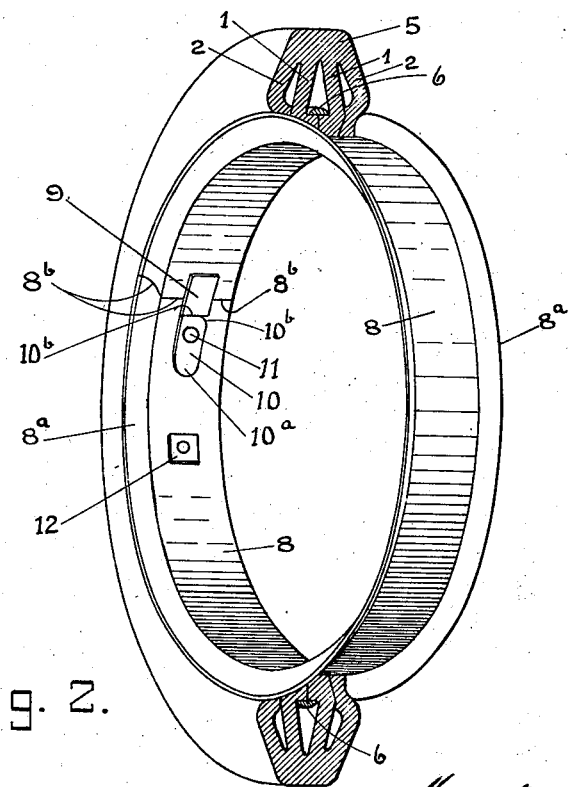

In the latter Figs. 1 and 2 show one preferred form of my tire improvements; Fig. 1 being a transverse section through the tire secured to a standard demountable tire-rim; and Fig. 2 being a perspective view of the complete rim on which this tire is mounted, the rim being of the contractible and expansible type and only one-half of the tire being illustrated with its ends shown in transverse section.

Describing now my invention by reference to the illustrated preferred embodiment thereof, the tire of the drawings comprises substantially radial load-supporting and shock-absorbing inner members 1—1 and laterally stabilizing or bracing outer members 2—2. These members are relatively closely adjacent, separated by proper spaces, two of which 3—3 are similar in cross-section and a third space being designated 4.

The radially outer portions of all the members are integrally united by a relatively wide tread-portion 5 including sides which are divergent toward the base of the tire. This provides a tread-portion whose outline resembles that of a pneumatic tire in ground contact and like that tire resists penetrating into a soft roadway and adds to its ability to climb out of ruts, etc.

The aforesaid load-supporting and shock-absorbing inner members 1—1 are comparatively tall and thin; and in radial direction adjacent the spaces 3 and 4 are substantially straight and steeply converge toward the tread, the result of their convergence being that the opening 4 in cross-section is substantially V-shaped, the radially inner part thereof being closed by shoulders $1^a$—$1^a$ on the base portions of said members.

The lateral stabilizing or bracing outer members 2—2 in cross-section are each elbow-shaped, their radially outer limbs converging toward the tread and their radially inner or basal limbs toward the rim-engaging portion of the tire. The result is that each of the spaces 3 in cross-section is substantially an obtuse-angled triangle with its longest side formed by the side of the adjacent inner member 1.

The respective members 1—1, 2—2 and spaces 3—3 and 4 may be circumferentially continuous around the tire. Also the whole tire is preferably molded as an entirety. The material is, of course, rubber or a rubber compound or other suitable rubber-like tire material with or without fabric reinforcings and the like.

I accomplish a narrow base for this tire to fit a standard pneumatic tire rim and secure it thereto by adaptations and means as follows:—The basal portions of the inner substantially radial members 1—1 are formed with shoulders $1^b$—$1^b$, which may be inclined and which overlie complementary foot-portions $2^a$—$2^a$ on the outer members when all of the members are together with the tire in operative position on the rim. The foregoing coupled with the elbow-shape of the outer members 2—2 provides the narrow base for the tire.

6 is a metal ring made of half-round stock, said ring being put into the cavity 4 after the tire has been molded. The inner members 1—1 of the tire are then brought together so that the flat-portion of the ring bears upon both of their shoulders $1^a$—$1^a$ for securing the tire to the rim as will be explained later.

7 is a piece of wire having pointed legs like a staple which may be driven or forced into the outer legs as in Fig. 1 to act as a binder to hold all of the members 1 and 2 together before the tire is mounted on any rim. There may be a plurality of these applied at intervals around the tire.

8 is a standard pneumatic-tire rim having side-flanges $8^a$—$8^a$. The flange-space is adapted to receive snugly the above described basal portions of the members 1 and 2 as in Figs. 1 and 2 with the outwardly curving flanges supporting the elbow-shaped outer members 2.

This standard flanged rim 8 is circumferentially discontinuous, being transversely severed at 8ᵇ (Fig. 2). This permits the rim to be contracted to apply it to the tire, after which it can be expanded into the position shown in Fig. 2 with the base of the tire seated in the rim-space.

Any form of expansible rim may be employed; also any suitable means for releasably locking the rim in its expanded condition. The locking means shown is of the well-known form and comprises substantially a lug 9 (Fig. 2) projecting from one free end of the rim over its other free end when said ends are adjacent in expanded position; and further comprises a member 10 (Fig. 2) pivoted at 11 to the opposite end of the rim from the lug 9, said member 10 having a finger-portion 10ᵃ and a cam-cornered end 10ᵇ, the latter being adapted, when the member 10 is rotated into its illustrated position (Fig. 2) from a position at right angles thereto, to bear against and on the end of the lug 9, thereby forcing to their respective abutting positions the free-ends of the flanged rim and locking the rim in its fully expanded condition as shown in Fig. 2.

The inside diameter of the ring 6 is sufficiently small so that when the rim is fully expanded, the foot portions of the inner members 1—1 will be securely clamped between said ring and the rim. At the same time the portions of said inner members that overlie the foot portions of the outer members 2—2 will securely clamp the latter to the rim and the adjacent flanges.

Also my tire may be used on other rims including any standard form of detachable rim for pneumatic tires, having one or both flanges detachable from its non-expansible base section. My tire containing the above described ring 6 will be forced laterally over and upon the base section of the rim and then the detached flange or flanges will be applied in accordance with the usual practice in using detachable rims.

For a tire to possess good riding qualities when used on a high speed motor-vehicle, it is necessary that it be not only highly and resiliently yielding so as to absorb to the maximum extent the inequalities of the road surface, but also it should be sufficiently rapid in its action to yield to the inequalities of the road as rapidly as they are met with in the rapidly rolling passage of the tire over the roadway. In a pneumatic tire the cushioning medium is the compressed air contained in the tire, and as air possesses a low inertia and a low resistance to flow, such a tire is able to act very quickly in yielding to the rapidly occurring road irregularities which are met with in a vehicle travelling at a high speed on the roadway.

On the other hand, in making a non-inflated tire out of a material such as rubber, rubber compounds, or the like, the cushioning effect of the tire must for satisfactory results be produced by the flow of the material itself of which the tire is formed. The rate of flow of any solid material such as rubber, rubber compounds, or other like materials, is much slower than that of air, of other gases. It is necessary, therefore, in producing a tire having cushioning effects and acting substantially as quickly as a pneumatic tire, that the rubber, or other material of which it is composed, shall be so arranged that in giving the cushioning action through an actual flow of the material it will have the shortest distance through which to flow. Furthermore, it is necessary, in using rubber compounds having relatively freely-flowing characteristics, that no portion of the material shall have to flow very far, or otherwise excessive heating from such flow is likely to occur, resulting in de-vulcanization. In order, therefore, for the tire to have the desired quickness of action in yielding to the road irregularities and quickly resuming its normal condition and at the same time permitting a maximum amount of yield or compression without excessive flowing movements of the material, the load-supporting members 1—1 of the tire should be relatively tall for a maximum total compression and relatively thin in cross-section for quick action with free spaces into which said load-supporting members may expand so that the flow of the material will be largely perpendicular to the direction of the force acting on them. At the same time said load-supporting members 1—1 in yielding to the forces acting on them should compress and enlarge laterally without buckling, and they therefore for maximum effectiveness should be substantially straight. Furthermore, since a tire in actual service on the roadway is subjected not only to forces acting vertically against its tread, but also to lateral forces of considerable magnitude, it is necessary that either the load-supporting members themselves provide the tire with sufficient lateral stability to withstand such lateral forces as by being relatively thick and not too steeply convergent, or that other members be provided co-acting with the load-supporting members to properly resist such lateral forces. In this present tire the load-supporting members 1—1 are such that they act principally as such in order to enable them to have quickness of action to the highest degree as shock absorbers in cushioning the forces acting vertically with respect to the tread of the tire; and additional members whose function is almost entirely that of properly resisting and cushioning the forces acting laterally with respect to the tire, are provided by the outer elbow-shaped members 2—2 which, besides giving lateral stability to the tire, also act in conjunction with the tread portion to give the tire the proper degree of resistance to road penetration to enable it to practically duplicate the pneumatic tire in this respect and in the respect of easily getting out of ruts, etc.

12 is the usual stamped up boss on the inside of the standard rim having a hole through it to receive the valve-stem of the inner tube when a pneumatic tire is used.

Fig. 1 shows tread-openings 18—18 in the tread portion of the tire. These consist of transverse grooves or spaces open at the tread and extending through from the sides of the tread-portion 5 to and beyond the center of the tread, adjacent spaces extending alternately in the just described overlapping fashion from opposite sides of said tread-portion.

19—19 are spaced apart, integral projections from the body of the tread-portion located within said grooves 18—18 to act as pebble-ejectors.

In addition to what has been shown and described, other changes and modifications may be made in the practical embodiment of my improvements which will nevertheless still be within the spirit of the foregoing disclosure and within the meaning and spirit of the annexed claims, and which as such are accordingly intended to be covered thereby.

What I claim is:

1. In a tire, the combination of a tread-portion, space-separated load-supporting and shock-absorbing inner members which converge toward and unite with said tread-portion and which in radial direction are substantially straight adjacent said space, elbow-shaped laterally stabilizing outer members containing the inner members between them with one set of their limbs converging toward and uniting with said tread-portion and with their other set of limbs converging toward the base of the tire, the basal portions of all of the said members being adapted to be contained in a flanged tire-rim with the elbow-shaped members braced by said flanges.

2. In a tire, the combination of a tread-portion, space-separated load-supporting and shock-absorbing inner members which unite with said tread-portion and which in radial direction are substantially straight adjacent said space, elbow-shaped laterally stabilizing outer members containing the inner members between them with one set of their limbs converging toward and uniting with said tread-portion and with their other set of limbs converging toward the base of the tire, the basal portions of all of the said members being adapted to be contained in a flanged tire-rim, said basal portions of the inner members being adapted to be engaged by means for securing them to said rim and further being adapted to overlie and secure the basal portions of the outer members also to the rim.

3. In a tire, the combination of spaced inner and outer members, a tread-portion integrally uniting the radially outer portions of said members, the radially inner portions of said members being adapted to be contained in a flanged tire-rim, the radially inner portions of the inner members being adapted to be engaged by means for securing them to said rim and further being adapted to overlie the radially inner portions of the outer members so as to secure the latter also to the rim.

4. In a tire, the combination of a tread-portion, multiple inner and multiple outer members united to said tread-portion and diverging radially inwardly therefrom and from one another with angular expansion spaces separating said members adjacent said tread-portion, the basal portions of all of said members being adapted to collectively form the base of the tire and to be compressed within a flanged tire rim, and compression ring means carried by the basal portions of the inner members to effect such compression.

5. In a tire, the combination of a tread-portion, multiple load-supporting inner and multiple laterally stabilizing outer members united to said tread-portion and diverging radially inwardly therefrom and from one another with angular expansion spaces separating them adjacent said tread-portion, the space-separating portions of said inner members being substantially straight, the basal portions of all of said members being adapted to collectively form the base of the tire and to be compressed within a flanged tire rim, and means carried by the basal portions of the inner members to effect such compression.

6. In a tire, the combination of a tread-portion, multiple load-supporting inner and multiple laterally stabilizing outer members united to said tread-portion and diverging radially inwardly therefrom and from one another with angular expansion spaces separating them, all of which are acute angled adjacent said tread-portion, the space-separating portions of said inner members being substantially straight, the basal portions of all of said members being adapted to collectively form the base of the tire and to be compressed within a flanged tire rim, and means carried by the basal portions of the inner members to effect such compression.

7. In a tire, the combination of a tread-portion integrally united to multiple load-supporting inner and laterally stabilizing outer members which diverge radially inwardly therefrom and are separated from one another adjacent said tread-portion by expansion spaces which are enclosed by the basal portions of said members being collectively abutted to form the base of the tire, and base compression ring means carried within the space separating the inner members.

8. In a tire formed with separable basal portions, the combination of means for securing together said basal portions at localized points, comprising staple-like members insertable into the material of the tire.

9. In a hollow cushion tire adapted to be mounted on a standard pneumatic-tire rim having a substantially flat bottom with flanges projecting radially outward therefrom and terminating in laterally outward curved shoulders, the combination with a base of said tire formed to snugly fit said bottom and the curved flanges of the said rim of a base clamping-ring in the hollow of the tire, and means for causing clamping action on the base of the tire between the said ring and the said tire rim.

Signed at New York in the county of New York and State of New York this 12th day of September, A. D. 1921.

MAX CYRUS OVERMAN.